May 17, 1966 P. A. MEYER 3,251,470
FILTERS OF SUPERIMPOSED RODS
Filed March 20, 1962

INVENTOR
PHILLIP A. MEYER
BY *Milford A. Juten*
ATTORNEY

United States Patent Office 3,251,470
Patented May 17, 1966

3,251,470
FILTERS OF SUPERIMPOSED RODS
Phillip A. Meyer, Franklin Park, Ill.
(R.R. 1, Box 171, Palatine, Ill. 60067)
Filed Mar. 20, 1962, Ser. No. 186,288
9 Claims. (Cl. 210—184)

The present invention relates to filters of large filtering capacity per unit of size and of large residue retaining capacity before replacement or cleaning is required and which have a minimum of obstruction to the flow of fluid and which can be cleaned and replaced with a minimum of effort.

Heretofore filters have been provided for many uses such as oil filters of automobiles, but after a relatively short time the filters have become clogged so that frequent replacement of the filter or filter cartridge has been necessary, and in many cases it was not possible to clean the filter cartridge and consequently the cost of filtering has been expensive.

An object of the present invention is to provide a filter which overcomes the objections of the prior art structures and to provide an efficient and relatively inexpensive filter which will last the life of the equipment with which it is used.

Another object of the invention is to provide a filter cartridge which is made of reducing size passages in the direction of flow.

Another object of the invention is to provide a filter cartridge made of rod like elements which may be flexible or rigid and can be used for all filtering purposes without requiring complete redesign for different materials used as the filtering media or for different fluids with which the filter is used.

Other and further objects will be apparent as the description proceeds and upon reference to the accompanying drawing wherein.

Figure 1:
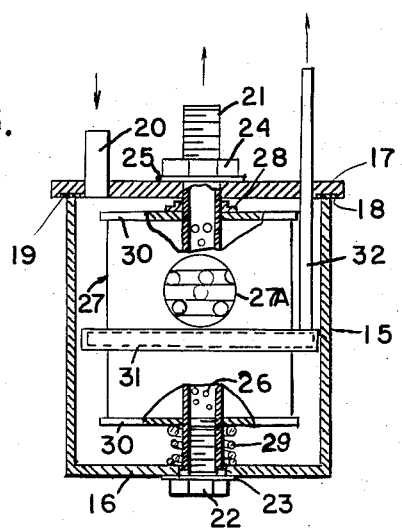
FIG. 1 illustrates one form of filter showing the housing in axial section with parts broken away and parts in elevation and with a magnified portion of the periphery of the filter cartridge and also showing the circumferential trough strip suction cleaning device movable axially along the periphery of the filtering cartridge.

Briefly the present invention comprises a filter cartridge formed of individual rod-like filter elements arranged in crisscrossing relation providing passageways along the series of the crisscrossing rods which pasageways may become smaller in the direction of fluid flow to filter out particles in the liquid or other fluid while permitting large accumulations of particles without clogging the filter thereby reducing the necessity of replacement or cleaning of the filter. The invention also provides a housing for the filter cartridge and means to clean the cartridge while in operation without requiring complete disassembly for each cleaning by the incorporation of a suction cleaning device therein. One form of the filter also includes inlet and residue outlet means to provide cyclonic separation to remove the heavier particles by centrifugal force in the moving liquid or fluid.

Referring more particularly to the drawing a filter housing includes a hollow cylinder 15 closed at one end 16 and having a removable cover 17 with an annular groove 18 therein receiving a gasket 19 for sealing the open end of the housing. An inlet nipple 20 is secured to the cover and provides for connection to the supply of fluid to be filtered. The cover 17 and closed end 16 are provided with centrally disposed apertures for receiving a core pipe 21 which is also the outlet tube for the filtrate, said outlet tube being internally threaded at the lower end and receiving stud 22, the head of which engages a sealing gasket 23 providing fluid tight connection with the housing. The upper end of the outlet tube is held by a nut 24 engaging a gasket 25 sealing the upper end and also reacting with the stud 22 to maintain fluid tight relation between the housing 15 and the cover 17.

Figure 2:
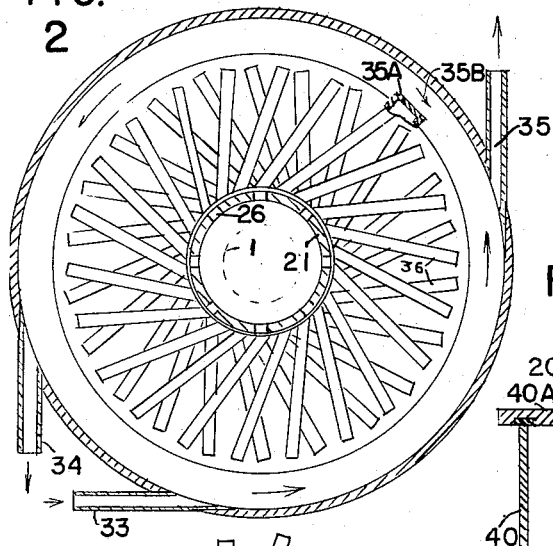
FIG. 2 is a transverse section on an enlarged scale of a modification showing a linear trough strip suction cleaning device and showing tangential fluid inlet and oppositely disposed tangential residue outlets for assuring cleaning of the fluid, with the section taken to show one end wafer in plan.

The fluid flow is shown by arrows in the drawing and in FIG. 2 a trough 35A receives the less dense particles and such particles are removed by the suction applied to the suction trough both before and after the particles enter the filter cartridge. The suction trough is moved in the direction of the arrow 35B to cause the less dense particles collecting adjacent the periphery of the cartridge to be removed and to pass along the trough to the suction outlet. It will also be apparent that the strip trough 35A will serve to clean the interior of the filter cartridge when the suction in the trough is sufficient to locally overcome the tendency of the fluid to pass through the cartridge in the direction shown by the arrows. This fluid flow for cleaning the cartridge can be obtained by increasing the pressure in the filter cartridge or core tube 21 above the suction in the trough 35.

The core pipe outlet tube 21 is provided with inlet apertures 26 throughout an intermediate portion of its length and a filter cartridge 27 is supported thereon being retained between a flange 28 fixed to the core tube 21 at the upper end and a compression spring 29 at the lower end reacting between the lower end 16 of the housing and the bottom of the cartridge. Apertured pressure plates 30 are slidably received on the core tube 21 to engage the ends of the cartridge and apply axial pressure on the cartridge 27, the pressure plates preferably projecting radially outwardly from the periphery of the cartridge for limiting movement of a suction trough 31. It will be apparent that the reaction of the spring 29 serves to retain the wafers in assembled relation, and such spring or similar means will also serve to retain superimposed series of rod elements shown in FIGURE 3 since the axial pressure between plates 30 will produce efficient frictional force between the oppositely disposed series of rods 36 to retain them in operative position and such force may be sufficient to partially deform the rods producing grooves therein.

As shown the housing 15 and the cartridge 27 are cylindrical, and to provide for cleaning during the operation thereof an annular trough 31 opening radially inward toward the cartridge 27 is slidably mounted in surrounding relation along the periphery of the cartridge and movable between the lower and upper pressure plates, by a suction tube or tubes 32 communicating with the trough 31. The suction tube 32 is of sufficient length to provide the necessary movement and slidably projects through the cover 17 in a fluid tight seal such as a gland or the like whereby the suction trough strip 31 can be moved over the entire outer periphery of the cartridge 27 and by applying the proper degree of suction to the suction tube 32, the residue in the cartridge can be removed without opening the filter housing and while the filter is in use.

The modified housing of FIG. 2 includes a tangentially arranged high velocity inlet nipple 33 and opposed tangentially arranged residue receiving outlets 34 and 35.

A suction trough strip 35A is supported for movement around the filter cartridge about the axis thereof and through a nipple to provide for cleaning while the filter is in use.

Figure 3:
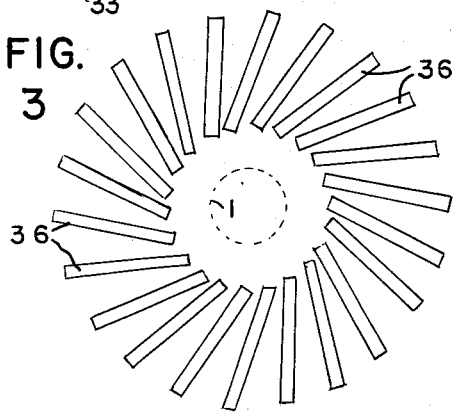
FIG. 3 shows one series of filter rodlike elements with the elements arranged in relative position for cooperation in criss-crossing relation on an identical or similar series of filter rod elements to form the wafer shown in plan in FIG. 2.

The lower portion of the filter cartridge is shown assembled in FIGURE 2 with the bottom wafer formed of two series of rodlike filter elements of FIG. 3 supported on the bottom pressure plate 30. The assembled filter wafer has the two series of rodlike filter elements in crisscrossing relation and secured together by welding such as the thermoplastic connection of nylon rods.

Figure 5:
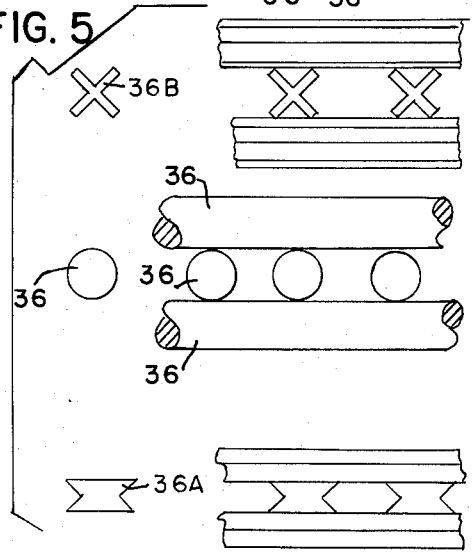
FIG. 5 illustrates several of the many possible forms of rodlike filter forming elements for obtaining different effects in the filtering operation.

The filter cartridge is made of a large number of wafers formed by two series of rodlike elements 36 arranged in the manner shown in FIG. 2 with one series being superimposed on the other series to provide a wafer assembly as shown by the bottom wafer shown in FIG. 2 which wafer assembly can be handled as a disk because the rodlike elements are secured together. The rodlike elements are preferable secured together at their crossing points and/or ends by welding, adhesive, grooving, pressure, retaining devices or the like to maintain their assembled relation. The rodlike elements are of a suitable material for use with the fluid being filtered. The individual rodlike elements of each wafer are secured together and the wafers are then stacked to provide the necessary length for the complete filter cartridge 27. The wafers are preferably made of two series of rodlike elements secured together and the cartridge is made of a stack of such wafers. The rodlike elements of the wafers may take the form of various cross sections as shown in FIG. 5 for example and can be connected together in the manner previously described. The magnified circle 27A shows the periphery of the cartridge on an enlarged scale with the rods circular.

The showing in FIG. 5 illustrates the end views and assemblies of several different shaped cross sections which the rodlike elements can take to show the various shapes of filtering passages and it will be apparent that many different shapes and forms can be used to obtain desired characteristics. By tapering the rodlike filter elements other characteristics can be obtained. It will be apparent that some of the series of rodlike elements can be of one shape and another series of another shape thereby providing almost any desired shape of passage for the fluids for selectively separating different shaped particles from the fluid.

The series of rodlike elements can be conical in shape if desired thereby controlling the width of the path from the periphery to the center.

Figure 4:
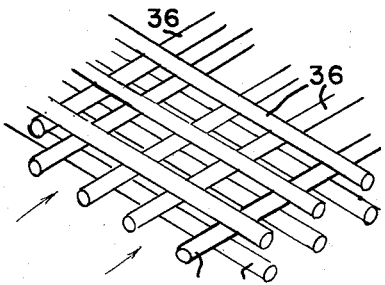
FIG. 4 is a diagrammatic view on an enlarged scale showing the arrangement of some rod like elements to illustrate the filtering passages formed by the crisscrossing rod like elements, when the rod like elements are in parallel relation, it being understood that the rodlike elements are in converging relation toward the center in FIGS. 1 to 3.

By having the rodlike elements in one series parallel to each other as shown in FIG. 4 filtering action can be obtained in which the filter passages are of substantially constant cross section. The wafer may be made with one series of rodlike elements parallel and others converging and many variations are possible within the scope of the invention.

Referring to the wafer shown in FIG. 2 it will be apparent that the arrangement provides converging rods forming constantly reducing passages toward the center of the wafer and the cartridge whereby the particles of the residue will be retained in the smaller inner ends of the passages and residue will be retained in the remainder of the passages outwardly until the passage becomes filled to adjacent the periphery of the cartridge. The invention assures that maximum residue will be retained for the given size of the cartridge and the size of the filter housing. The passages from the periphery of the cartridge toward the center in the modification shown may be of a constant height corresponding to the thickness of the rodlike elements while the width of the passages will become progressively smaller toward the center.

The cartridge can be made spherical by tapering the rodlike elements and arranging their lengths to provide a spherical shape, and a suction structure having a corresponding shape can be used to remove the residue in the manner similar to that shown for a cylindrical shape cartridge except that the trough will be rotated about its diameter instead of being moved linearly.

Figure 6:
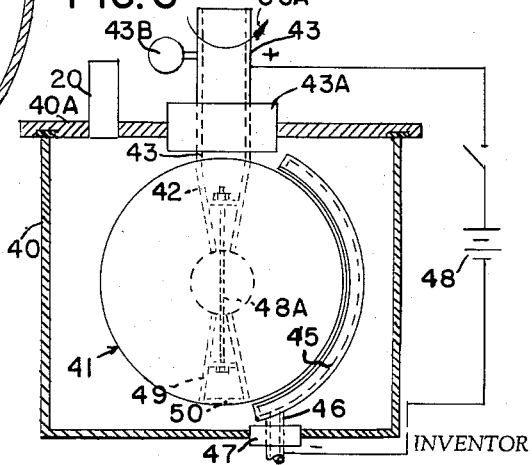
FIG. 6 is a section of a rotatable spherical core filter having a suction trough insulated from the housing adjacent the periphery for removing residue from the filter and serving as one electrode of a heating device for de-icing the filter.

The modification shown in FIG. 6 has a housing 40 of suitable shape with a cover 40A and a spherical cartridge 41 made of crossing conical shaped rods having their large diameters at the outer surface of the cartridge and their smaller diameters adjacent the center leaving a spherical hollow center. A conductive core pipe having a conical section 42 and a cylindrical section 43 extends outwardly from the hollow center of the spherical cartridge 41 through a suitable sealing gland 43A in the cover 40A. To provide for rotation of the cartridge 41 past an electrically conductive trough 45; a handle 43B extends from the cylindrical section 43 of the core pipe outside of the housing 40. The circular shaped trough 45 similar to trough 35A is connected to a suction tube 46 projecting outwardly from the housing 40 through suitable electrical insulators 47. A source of current such as a battery 48 is connected by one lead to suction tube 46 and by another lead through a switch to the core pipe 43 of the filter thereby providing means to heat the filter and prevent icing. The heating can be done by other means such as inductive heating if desired.

The cartridge may be made of conical shaped disks with the center disk substantially flat and with each disk being formed of crossing conical or tapered rods.

The center disk corresponding to the great circle perpendicular to the axis of the core pipe is substantially flat and the other disks are of hollow conical shape and all the disks are held together by the clamping action of core pipe sections 42 and 49 which are removably held together by the bolt 48 having nuts engaging the narrow struts in the core pipe sections. A removable disk 50 closes the outer end of core pipe section 49. To provide for assembly the suction pipe 46 is slidably mounted in its insulating bushing 47 so that the trough 45 can move with the spherical cartridge. Alternatively the trough and its suction pipe can be mounted in the cover 40A so as to be removable as a unit.

To clean the filter while in use the cartridge is rotated in the direction of arrow 50A by handle 43B and the suction is applied to the suction tube 46 causing the periphery of the spherical cartridge to be cleaned as it passes the trough 45.

To obtain optimum filtering parameters the distance between the planar elements at the inside diameter of the wafer must approximately equal the diameter of the elements.

A wafer is made up of two parallel planes of two series of rod like elements in contact with each other with radiating filter elements tangent to an imaginary circle indicated by dotted line circle 1 the diameter of which equals the diameter of the circle 1 of the gorge of the hyperboloid of revolution. The inside diameter of the wafer is then made larger than the circle 1 indicating the gorge.

It will be noticed that the inter element distance increases outward toward the outside circumference of the wafer due to the divergence of the rod like elements.

This gives a graduated filtering where oblong particles having a minor diameter less than the element diameter will enter the wafer and stop at the point where the particle's second minor diameter equals the inter element distance or at some earlier position. This ability to allow a portion of the retained particles to penetrate the face of the filter will allow the filter to pass more filtrate before cleaning is necessitated by the degree of the fluid pressure drop through the filter. The filter has a cross-sectional flow area greater than the cross-section of the particles which it retains by virtue of the relative shapes of the cross-section of the filter elements, the angle between the elements and the inter-elements distance. In this way the retained particles do not completely block the filter pattern.

Due to the uniformity of the filter elements and the manner in which they are arranged, this arrangement readily lends itself to specific and highly technical applications depending upon the cross-sectional shape or shapes of the particular element or elements used such as round, hexagonal, star, etc. The subtended angle between adjacent elements in the plane, and the normal and specific angle between the elements and the flow can also be arranged variable parameters.

The above parameters among others will influence the internal hydrodynamic flow characteristics which may be varied to suit many applications including the arrangement where it is necessary to pass high percentage of a specific size particle yet completely stop a size particle only slightly larger.

Some of the advantages of the filter of the present invention are:

(1) The wafers can be made from long lengths of wire, tubular material or extruded shapes with little or no machine or forming work to shape the elements with mass production.

(2) The simple arrangement of the elements permits a wide latitude of designed flow and particle parameters.

(3) Relatively high flow rates are possible in certain configurations.

(4) The very precise ability to positively stop all particles of an undesirable specific size and still permit to pass a majority of permissible size particles thus increases the useful filter time between the cleanings due to selective filtration.

(5) The high loading capacity with residue before the pressure drop because of the graduated filtering through the depth of the filter and also the possible cross-flow within the filter stack around accumulated residue increases the period of useful operation before servicing, cleaning or replacement.

(6) The filter can be made from any material which can be formed in suitable lengths of the desired cross-sectional shape, giving the high uniformity of construction and physical bonding of the elements may not be necessary as the parts can be held in stack or cartridge form by suitable pressure and, or retainers, or physically joined by attachment grooves.

(7) The filter wafers may be molded, forged, presscut, or manufactured in practically any manner giving the manufacturer the widest latitude in producing the wafer-constituents, the wafer, or wafer sets. The specific construction of the wafers and their attachment; the filter housing, corepipe, and end supports can be of many different designs and materials.

(8) The filter is adaptable to many methods of cleaning including back-flushing, strip suction cleaning while in operation, dissolving of the residue and back or through flushing, or disassembly or the filter or filter cartridge can be disposable after use.

(9) The elements can be arranged and attached in any number of ways including (a) Direct bonding to adjacent elements by various methods (weld, adhesive, etc.).

(b) Mechanical attachment by means of slots, grooves, clips, springs, clamps, etc.

(c) Magnetic.

(d) Pressure; friction or deformation.

This wide range of fabrication techniques and wide latitude in selection of materials gives the filter the ability to accommodate a very wide range of materials, fluids and the like and under a wide range of temperatures and physical environment. The feature of making the filter from normally very hard and unworkable substances which resist or are damaged by bending and twisting permits the filter to be constructed of materials which cannot at present be used for filtering purposes.

Ceramic rods or tungsten filaments can be used for extremely high temperature molten metal filtering.

Glass fibres or stainless steel threads can be used to filter highly corrosive or active materials.

Acid and solvent resistant fibres can be used to allow the filter to be cleaned by dissolving the residue rather than backflushing.

Permeable and nonpermeable plastics formed by molding, extrusion, casting, etc. can be used.

(10) The range of shapes, angles, and proportions in the filter itself allows a wide selection in the internal hydrodynamic properties for all possible applications.

(11) Basically the number of planar elements required is a function of the diameter-shape of the element and the inside diameter of the wafer. Considering the desired flow parameters and basic element angle.

(12) The method of arranging the filter fibres has been in a pattern of wafers and a compressed hyperboloid of revolution is not intended to restrict this pattern to cylinder type stacks.

(A) By using tapered filaments the waferstack may be made into a hollow sphere, resulting in a spherical filter.

(B) By having the interelement angle of fibres in each series of rodlike elements in a single plane zero degrees a filter wafer and cartridge of rectangular proportions of uniform characteristics can accommodate linear-flow, normal to the rectangular filter pad.

(C) By varying the construction parameters singly or simultaneously and in linear or nonlinear manner any desired shape and design of filter can be produced with practically any capacity of flow and filtering parameters, and by simple geometric or parametric value changes the characteristics of the filter may be arranged for practically any application.

(D) By discreet choice of element material the filter can also serve catalytic and other purposes simultaneously eliminating the need for such specific separate apparatus.

(E) The specific construction also permits high wafer stack strengths permitting abnormally high fluid pressure differentials to be established across the filter.

(F) Due to controllable expansion and contraction stack coefficients cyrogenic and high temperature uses are easily accommodated by these filters having appropriate parameters and fiber-element material.

(13) Most filtering applications require only small residue capacity filters and can be small. Filters that will accept large amounts of residue and simultaneous high filtrate flow rates are large and cumbersome and require frequent replacement and/or cleaning, necessitating shutdown of the flow or requiring a twin filter system for use while one is being cleaned or replaced. The twin filter causes a doubling of cost, size, maintenance, and weight.

By the introduction of high velocity circular flow about the spherical or cylindrical wafer stack and suitable residue collectors and drains the higher, relative, density particles can be drawn off on the periphery and reduce the amount of residue collected by the filter stack.

The filter stack can be suction cleaned while the filter is in operation by the linear suction trough strip FIG. 2 or circumferential suction trough strip 31 of FIG. 1.

This in-use-cleaning can be continuous or automatically actuated when the differential pressure across the filter exceeds a specified value. The linear strip type cleaner is suitable for use to remove lower density particles as they circulate to the center before actually being trapped by the filter stack.

The strip suction cleaner shown in FIG. 1 is a moving vacuum cleaner which locally reverses the flow through the filter removing the accumulated residue from the adjacent portion of the filter. The strip suction may move about the filter stack or the filter stack may rotate under the fixed suction strip in the case of the linear or median type strip. The circumferential strip suction trough used in FIG. 1 about a cylindrical filter is translated axially along the cylinder.

(14) The use of suitable electrically conductive material in the wafer construction of the filter provides a fluid heater by the filter to specifically raise the temperature of the fluid and providing for the filter to de-ice itself. This de-icing is important in uses where the fluid contains moisture, water droplets, or ice crystals which can freeze on and block the filter or prematurely clog the filter. The resistive and or inductive heating of the filter melts this ice and by raising the temperature of the fluid prevents ice blockage downstream of the filter eliminating the need for fluid deicer additives.

The electrical power can be of direct or alternating type and can be introduced in a variety of ways, directly to the stack or through the fluid or suction strips.

It will be apparent that various changes can be made within the spirit and scope of the present invention as defined by the valid scope of the appended claims.

What is claimed is:
1. A filter comprising a housing for receiving a filter cartridge, means to provide inlet and outlet communication from the exterior of the housing to the interior thereof, a group of wafer filter elements within said housing in superimposed relation, each wafer filter element comprising a first series of rods in one plane and generally converging toward the periphery of an imaginary circle, a second series of rods in overlying relation to said first series of rods and crossing and secured against said first series of rods and extending toward the periphery of the same imaginary circle, said series of rods terminating short of said imaginary circle thereby providing generally radial open spaces extending from the periphery of the wafer filter element of the first series and second series of rods whereby gradually reducing passage spaces are formed by the said rods of each series of rods, a plurality of wafer filter elements coaxially arranged in superimposed relation with similar wafer filter elements forming a cartridge whereby the cartridge for the housing is made to be of a size having a smaller dimension than the interior of the housing, means providing an inlet to the outer periphery of the cartridge and to provide an outlet from the opening of larger dimensions than said imaginary circle formed within the filter cartridge.

2. The invention according to claim 1 in which the outlet includes a core pipe extending through the cartridge and means are provided to secure the first series of rods of one wafer to the second series of rods of the same wafer, and means are provided to force the rods of adjacent wafers into abutting contact.

3. A filter comprising a fluid housing open at one end, means to close said one end in fluid tight relation, a filter cartridge in said housing, said cartridge having a plurality of superimposed wafers, each wafer including a first series of rods extending toward the center in generally successive tangential relation to a continuous curve, a second series of rods extending in the opposite direction toward a continuous curve and overlying and secured against the first series, biasing means in the cartridge and housing to maintain the wafers in cooperative relation whereby fluid may enter the outer periphery of the cartridge and flow toward the center in converging paths which progressively become of smaller dimension in at least one dimension whereby the fluid will be filtered for an extended period of time as particles are lodged in the spaces between adjacent rods and means providing an inlet to the outer periphery of the cartridge and an outlet at the interior adjacent the continuous curve.

4. The invention according to claim 3 in which a suction strip is located within the housing in operative relation to the cartridge to remove residue therefrom.

5. The invention according to claim 4 in which the suction strip is straight.

6. The invention according to claim 4 in which the suction strip is insulatingly mounted in the housing and a conductive core passes into the cartridge and is insulatingly supported in the housing with means to relatively move the suction strip with respect to the cartridge, and means are provided for conducting electrical current to the suction strip and the core whereby heating is produced within the filter.

7. The invention according to claim 3 in which the wafers are each made of two series of rods with the first series permanently secured to the second series and the individual wafers are held in assembled relation by a force normal to the plane of the wafers.

8. The invention according to claim 3 in which a core pipe extends through the cartridge and is insulatingly supported from the housing, and a supply of electric current is provided to the core and to a portion of the filter of conductive material spaced from the core whereby electrical heating can be obtained by passage of current through the fluid in the filter.

9. The invention according to claim 3 in which the cartridge is of cylindrical shape and an annular trough surrounds the cartridge and suction producing means extends to the trough and provides for moving the trough over the surface of the cartridge for cleaning the particles without disassembly.

References Cited by the Examiner

UNITED STATES PATENTS

| 1,075,978 | 10/1913 | Jorein et al. | 210—184 X |
| 1,512,977 | 10/1924 | Depue | 210—411 X |
| 1,640,198 | 8/1927 | Lobit | 210—483 X |
| 2,066,479 | 1/1937 | McIssac | 210—411 X |
| 2,413,431 | 12/1946 | Briggs | 210—488 |
| 2,428,654 | 10/1947 | Collins | 210—496 X |
| 2,495,095 | 1/1950 | Ewbank | 210—352 X |
| 2,672,239 | 3/1954 | Baril | 210—407 X |
| 2,898,201 | 8/1959 | Hayes | 23—288.3 |
| 3,048,276 | 8/1962 | Darnell | 210—304 |
| 3,092,578 | 6/1963 | Cannon et al. | 210—304 |
| 3,132,099 | 5/1964 | Eilhauer | 210—499 X |

FOREIGN PATENTS

| 214,774 | 5/1958 | Australia. |
| 769,924 | 3/1957 | Great Britain. |

REUBEN FRIEDMAN, *Primary Examiner.*

HERBERT L. MARTIN, *Examiner.*